United States Patent
Hammarqvist

(10) Patent No.: US 9,697,845 B2
(45) Date of Patent: Jul. 4, 2017

(54) NON-LINEAR ECHO PATH DETECTION

(71) Applicant: Microsoft Technology Licensing, LLC, Redmond, WA (US)

(72) Inventor: Ulf Nils Hammarqvist, Stockholm (SE)

(73) Assignee: Microsoft Technology Licensing, Redmond, WA (US)

( * ) Notice: Subject to any disclaimer, the term of this patent is extended or adjusted under 35 U.S.C. 154(b) by 0 days.

(21) Appl. No.: 14/720,351

(22) Filed: May 22, 2015

(65) Prior Publication Data

US 2016/0225385 A1   Aug. 4, 2016

(30) Foreign Application Priority Data

Feb. 3, 2015 (GB) .................................. 1501791

(51) Int. Cl.
G10L 21/0208 (2013.01)
H04M 9/08 (2006.01)

(52) U.S. Cl.
CPC ......... *G10L 21/0208* (2013.01); *H04M 9/082* (2013.01); *G10L 2021/02082* (2013.01)

(58) Field of Classification Search
None
See application file for complete search history.

(56) References Cited

U.S. PATENT DOCUMENTS

| | | |
|---|---|---|
| 5,400,399 A | 3/1995 | Umemoto et al. |
| 5,592,548 A | 1/1997 | Sih |
| 7,027,592 B1 | 4/2006 | Straussnigg et al. |
| 7,177,419 B2 | 2/2007 | Sedarat et al. |
| 8,787,561 B2 | 7/2014 | Dyba et al. |
| 2003/0076949 A1 | 4/2003 | Laberteaux |
| 2003/0235244 A1 | 12/2003 | Pessoa et al. |
| 2004/0252827 A1 | 12/2004 | Sasaki |
| 2010/0304679 A1 | 12/2010 | Zeng et al. |
| 2011/0013766 A1 | 1/2011 | Dyba et al. |
| 2011/0019831 A1 | 1/2011 | Liu |

(Continued)

OTHER PUBLICATIONS

"How to use Acoustic Echo Cancellation [AEC]", Available at: <http://bssaudio.com/product_downloads/SoundwebLondonAppGuides/accoustic-echo-cancellation.pdf>, Nov. 25, 2011, 12 pages.

(Continued)

*Primary Examiner* — Paul Huber

(57) ABSTRACT

A user terminal comprising; a loudspeaker; a microphone; and an audio signal processing module comprising: a reference signal generator configured, prior to establishment of a communication event over a network with at least one further terminal, to generate and output an audio reference signal to the loudspeaker for playout; an echo removal module configured to perform echo removal on audio signals received via the microphone during the communication event; and a detector configured, prior to establishment of the communication event, to: determine characteristics of the reference signal; receive an audio signal output from the microphone which includes echo resulting from the outputted reference signal; determine characteristics of the received audio signal; compare the determined characteristics of the reference signal with determined characteristics of the received audio signal to detect a nonlinear echo path of the echo, and configure a component of the audio signal processing module based on this detection.

20 Claims, 5 Drawing Sheets

(56) References Cited

U.S. PATENT DOCUMENTS

2013/0216056 A1    8/2013    Thyssen
2014/0357323 A1    12/2014    Ahgren
2015/0003606 A1    1/2015    Nemer

OTHER PUBLICATIONS

Fukui,"Acoustic Echo Canceller Software for VoIP Hands-free Application on Smartphone and Tablet Devices", In Proceedings of IEEE International Conference on Consumer Electronics, Jan. 10, 2014, 2 pages.

Kellermann,"LMS—Nonlinear Acoustic Echo Cancellation", In Proceedings of Multimedia Communications and Signal Processing, Oct. 18, 2013, 5 pages.

Kim,"Nonlinear Echo Cancellation Using a Correlation RLS Adaptation Scheme", In Proceedings of the 5th WSEAS International Conference on Instrumentation, Measurement, Circuits and Systems, Apr. 16, 2006, 5 pages.

Mehrens,"Inside A Cellular Telephone", In Proceedings: The Jun. 2011 meeting of the Audio Engineering Society—Pacific Northwest Section Available at: <http://www.aes-media.org/sections/pnw/ppt/scottm/2011-06-pnw_aes.ppt>, Jun. 27, 2011, 38 pages.

Schwarz,"Combined Nonlinear Echo Cancellation and Residual Echo Suppression", In Proceedings of 11th ITG Conference on Speech Communication, Sep. 24, 2014, 4 pages.

Shi,"Nonlinear Acoustic Echo Cancellation", In Proceedings: PhD Thesis at Georgia Institute of Technology Available at: <https://smartech.gatech.edu/bitstream/handle/1853/26704/shi_kun_200812_phd.pdf;jsessionid=DDBED26D9348F14F51BA8303495A139C.smart2?sequence=1>, Dec. 2008, 132 pages.

"International Search Report and Written Opinion", Application No. PCT/US2016/015489, Apr. 21, 2016, 10 pages.

"Second Written Opinion Issued in PCT Application No. PCT/US2016/015489", Mailed Date: Jan. 17, 2017, 6 Pages.

"International Preliminary Report on Patentability", Application No. PCT/US2016/015489, Apr. 21, 2017, 7 pages.

NON-LINEAR ECHO PATH DETECTION

RELATED APPLICATIONS

This application claims priority under 35 USC §119 or §365 to Great Britain Patent Application No. 1501791.6, filed Feb. 3, 2015, the disclosure of which is incorporated in its entirety.

BACKGROUND

A device may have audio input apparatus that can be used to receive audio signals from the surrounding environment. The device may also have audio output apparatus that can be used to output audio signals to the surrounding environment. For example, a device may have one or more speakers for outputting audio signals and one or more microphones for receiving audio signals. Audio signals which are output from the speaker(s) of the device may be received as "echo" in the audio signal received by the microphone(s). It may be the case that this echo is not desired in the received audio signal. For example, the device may be a user device (such as a mobile phone, tablet, laptop, PC, etc) which is used in a communication event, such as an audio or video call, with another user device over a network. Far-end signals of the call may be output from the speaker at the user device and may be received as echo in the audio signals received by the microphone at the device. Such echo can be disturbing to users of the call, and the perceived quality of the call may be reduced due to the echo. In particular, the echo may cause interference for near-end audio signals which are intended to be received by the microphone and transmitted to the far-end in the call. Therefore echo cancellation and/or echo suppression may be applied to the received audio signals to thereby suppress the echo in the received audio signal.

Echo cancellation (or "echo subtraction") techniques aim to estimate an echo signal included in the audio signal received at the microphone, based on knowledge of the audio signal which is output from the speaker. The estimate of the echo signal can then be subtracted from the received audio signal thereby removing at least some of the echo from the received audio signal. Echo suppression is used to apply frequency-dependent suppression to the received audio signal to thereby suppress the echo in the received audio signal.

SUMMARY

According to a first aspect of the present disclosure there is provided a user terminal comprising: a loudspeaker component; a microphone component; and an audio signal processing module, the audio signal processing module comprising: an audio reference signal generator configured, prior to establishment of a communication event over a communications network with at least one further user terminal, to generate an audio reference signal, and output the audio reference signal to the loudspeaker component for playout; an echo removal module configured to perform echo removal on audio signals received via the microphone component during the communication event; and a detector configured, prior to establishment of the communication event, to: determine characteristics of the audio reference signal; receive an audio signal output from the microphone component, wherein the received audio signal includes echo resulting from the outputted audio reference signal; determine characteristics of the received audio signal; compare the determined characteristics of the audio reference signal with the determined characteristics of the received audio signal to detect a nonlinear echo path of the echo, and configure a component of the audio signal processing module based on said detection.

According to another aspect of the present disclosure there is provided at least one computer readable medium storing a communication client application which, when executed on one or more processors of a user terminal causes the one or more processors to: generate an audio reference signal prior to establishment of a communication event over a communications network with at least one further user terminal, and supply the audio reference signal to a loudspeaker component of the user terminal; perform echo removal on audio signals received via a microphone component of the user terminal during the communication event; and prior to establishment of the communication event: determine characteristics of the audio reference signal; receive an audio signal output from the microphone component, wherein the received audio signal includes echo resulting from the outputted audio reference signal; determine characteristics of the received audio signal; compare the determined characteristics of the audio reference signal with the determined characteristics of the received audio signal to detect a nonlinear echo path of the echo; and configure a component of the communication client application based on said detection.

According to another aspect of the present disclosure there is provided a computer-implemented method performed by a communication client application when executed on one or more processors of a user terminal, the method comprising: generating an audio reference signal prior to establishment of a communication event over a communications network with at least one further user terminal; supplying the audio reference signal to a loudspeaker component of the user terminal; prior to establishment of the communication event: determining characteristics of the audio reference signal, receiving an audio signal output from the microphone component, wherein the received audio signal includes echo resulting from the outputted audio reference signal; determining characteristics of the received audio signal; comparing the determined characteristics of the audio reference signal with the determined characteristics of the received audio signal to detect a nonlinear echo path of the echo, and configuring a component of the communication client application based on said detection.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

For a better understanding of the present invention and to show how the same may be put into effect, reference will now be made, by way of example, to the following drawings in which.

DETAILED DESCRIPTION

Embodiments of the invention will now be described by way of example only.

Figure 1:
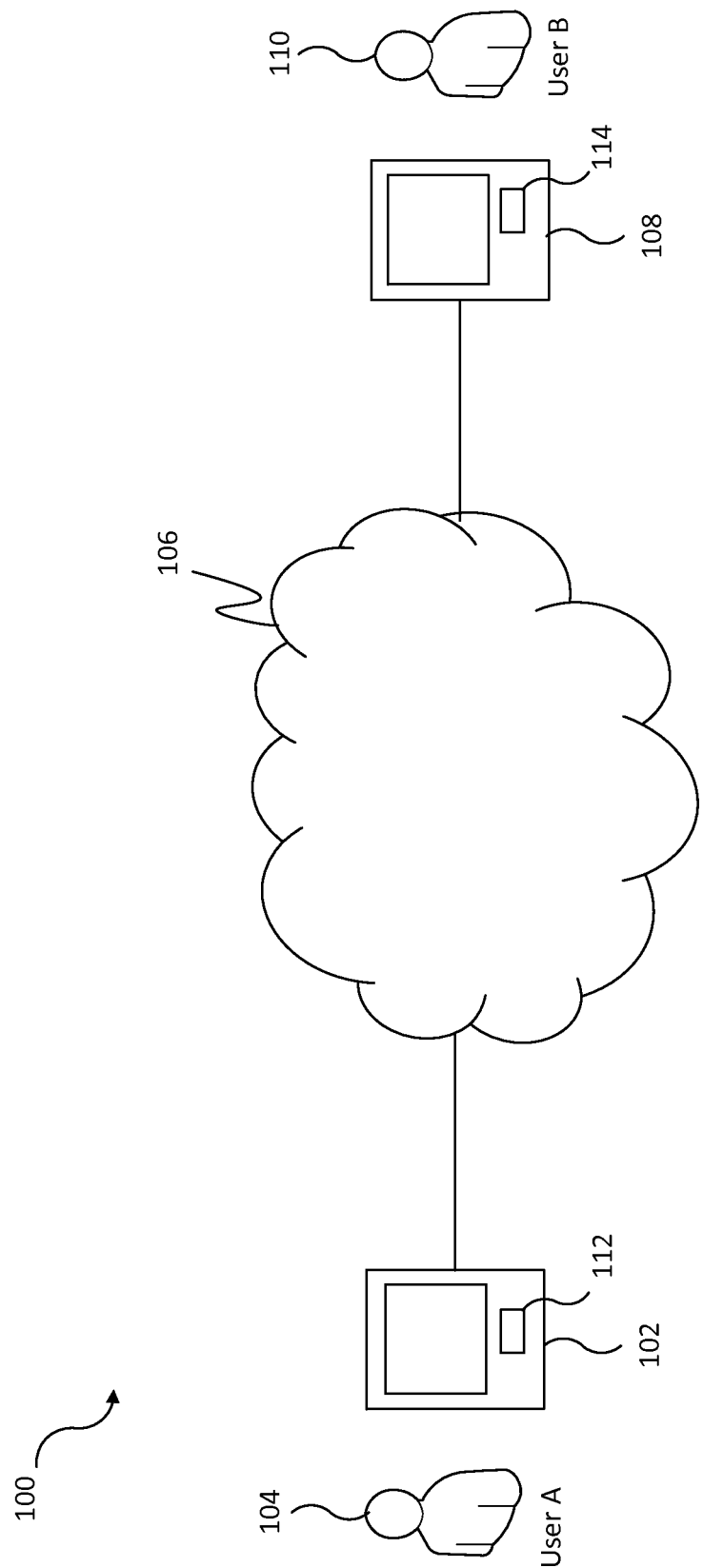
FIG. 1 shows a schematic illustration of a communication system.

FIG. 1 shows a communication system 100 comprising a first user 104 (User A) who is associated with a user terminal 102 and a second user 110 (User B) who is associated with a user terminal 108. The user terminals 102 and 108 can communicate over a communication network 106 in the communication system 100, thereby allowing the users 104 and 110 to communicate with each other over the communication network 106. The communication network 106 may be any suitable network which has the ability to provide a communication channel between the user terminal 102 and the second user terminal 108. For example, the communication network 106 may be the Internet or another type of network such as a High data rate mobile network, such as a 3rd generation ("3G") mobile network.

Note that in alternative embodiments, user terminals can connect to the communication network 106 via an additional intermediate network not shown in FIG. 1. For example, if the user terminal 102 is a mobile device, then it can connect to the communication network 106 via a cellular mobile network (not shown in FIG. 1), for example a GSM or UMTS network. User terminals participating in a communication event conducted over the communication network 106 may connect to the network 106 via the same or different types of network connection. For example user terminal 102 may connect to the communication network 106 via a WiFi connection, and the user terminal 108 may connect to the communication network 106 via a cellular mobile network (e.g. 2G/3G/4G etc.)

The user terminal 102 may be, for example, a mobile phone, a personal digital assistant ("PDA"), a personal computer ("PC") (including, for example, Windows™, Mac OS™ and Linux™ PCs), a tablet computer, a gaming device or other embedded device able to connect to the communication network 106. The user terminal 102 is arranged to receive information from and output information to User A 104.

The user terminal 102 executes a communication client application 112, provided by a software provider associated with the communication system 100. The communication client application 112 is a software program executed on a local processor in the user terminal 102. The communication client application 112 performs the processing required at the user terminal 102 in order for the user terminal 102 to transmit and receive data over the communication system 100. The communication client application 112 executed at the user terminal 102 may be authenticated to communicate over the communication system through the presentation of digital certificates (e.g. to prove that user 104 is a genuine subscriber of the communication system—described in more detail in WO 2005/009019).

The user terminal 108 may correspond to the user terminal 102. The user terminal 108 executes, on a local processor, a communication client application 114 which corresponds to the communication client application 112 executed at the user terminal 102. The communication client application 114 at the user terminal 108 performs the processing required to allow User 110 to communicate over the network 106 in the same way that the communication client application 112 at the user terminal 102 performs the processing required to allow the User A 104 to communicate over the network 106. The user terminals 102 and 108 are end points in the communication system. FIG. 1 shows only two users (104 and 110) and two user terminals (102 and 108) for clarity, but many more users and user devices may be included in the communication system 100, and may communicate over the communication system 100 using respective communication clients executed on the respective user devices, as is known in the art.

Devices typically have a dedicated audio signal processing module (such as a sound card) in addition to a local processor on the device. This audio signal processing module performs audio processing functions for the user device such as analogue to digital conversion (ADC) of audio signals captured at a microphone and digital to analogue conversion (DAC) of audio signals for playing out of a speaker.

It is common that the audio signal processing module introduces effects on the play out signal (i.e. the signal to be output from a speaker) in order to maximize the user experience (e.g. loudness enhancement effects included in the drivers and/or hardware). Those effects are achieved by the audio signal processing module, the functionality of which is outside of the control of, and which may be unknown to, applications (e.g. a communication client) executed on a local processor on the device that use the play out system available in the OS. For instance, it is common that hardware manufacturers include "dynamic range compression" (for example, maximization to maximize perceived loudness for a given peak signal level) in loudspeakers setups, e.g. in laptops, smartphones, tablet devices etc.

Dynamic range compression (otherwise referred to as dynamic compression or simply compression) reduces the volume of loud sounds or amplifies the volume of quiet sounds by narrowing or "compressing" an audio signal's dynamic range (e.g. to make quite parts more audible and/or prevent loud parts from being excessively loud). Downward compression reduces loud sounds over a certain threshold while quiet sounds remain unaffected, whilst upward compression increases the loudness of sounds below a threshold while leaving louder passages unchanged. Both downward and upward compression reduce the dynamic range of an audio signal. In this context, the dynamic range compression can be considered a "fast acting automatic gain control", where "fast" means too fast for the audio signal processing (e.g. echo cancellation) to be able keep up with gain changes that would result in the absence of the initial dynamic range compression (e.g. changes which would be too fast for the echo canceller to adapt to and which could thus result in echo leaks).

Both the user terminal 102 and the user terminal 108 may perform acoustic echo removal. There are two main ways to achieve acoustic echo removal, one being echo cancellation/subtraction and the other being echo suppression. Often these two approaches are combined.

The audio signal captured by the microphone of the user terminal 102 is transmitted over the network 106 for playing out by the user terminal 108. The microphone of the user terminal 108 captures an echo of the audio signal that was transmitted by user terminal 102. If that echo is not fully cancelled, then the user terminal 108 transmits it back to the user terminal 102. That received signal is played-out through the speakers of the user terminal 102, and an echo is captured by the microphone of the user terminal 102. If the echo canceller in the user terminal 102 is not able to completely remove that echo, the echo signal is transmitted again to the user terminal 108.

Echo cancellation typically makes use of a reference, which is typically some version of an audio signal before it is supplied to the loudspeaker, tapped from a point in a chain of audio signal processing before the loudspeaker, and models an echo path observed by that version of the audio signal. That echo path corresponds to the path taken by the audio signal to the loudspeaker, the air interface between the loudspeaker and the microphone, and the path from the microphone to the echo cancellation module.

In general, when a reference is sought in the output of a device play out (for echo cancellation or some other reference-based signal processing), it can be problematic if the device applies unknown non-linear processing that is not reflected in the reference and/or if non-linear contributions are introduced to the echo path caused by the physical properties of one or more of the loudspeaker, microphone and casing of the user terminal.

For instance, traditional echo cancellers are better suited to modelling linear distortions in the echo path and generally have problems accounting for nonlinear distortions that are present in the echo path. Such nonlinear echo paths can lead to echo leaks or echo residuals in the signal. That is, traditional echo cancellers typically perform best when there is a substantially linear relationship between the reference and the echo component picked up in the microphone signal.

However, when nonlinearities are introduced in the echo path. This creates challenges for echo cancelers as the nonlinear echo path is poorly modeled by traditional echo cancellation schemes, as discussed.

Some operating systems include functionality for feeding back the signal that is going to be played out to the application executed on the local processor. This signal that is fed back to the application executed on the local processor is referred to herein after as a "loopback signal". The loopback signal can then be used as a reference in the echo cancellation procedure. Examples of operating systems including this functionality are Microsoft's Windows 7, 8, XP and Vista, and Windows Phone 8 operating systems. An echo canceller that uses the loopback signal does not need to model those nonlinear distortions that are introduced by the audio signal processing module (as the audio signal processing module is effectively removed from the echo path) and, therefore, echo leaks are not expected. However, the loopback signal is not available for all operating systems. Examples of operating systems without this loopback functionality are Android and iOS mobile operating systems. In the absence of a loopback reference signal, echo cancellation may fail and produce echo leaks—among others, it is one aim of the present disclosure to prevent or at least reduce such echo leaks.

Figure 2:
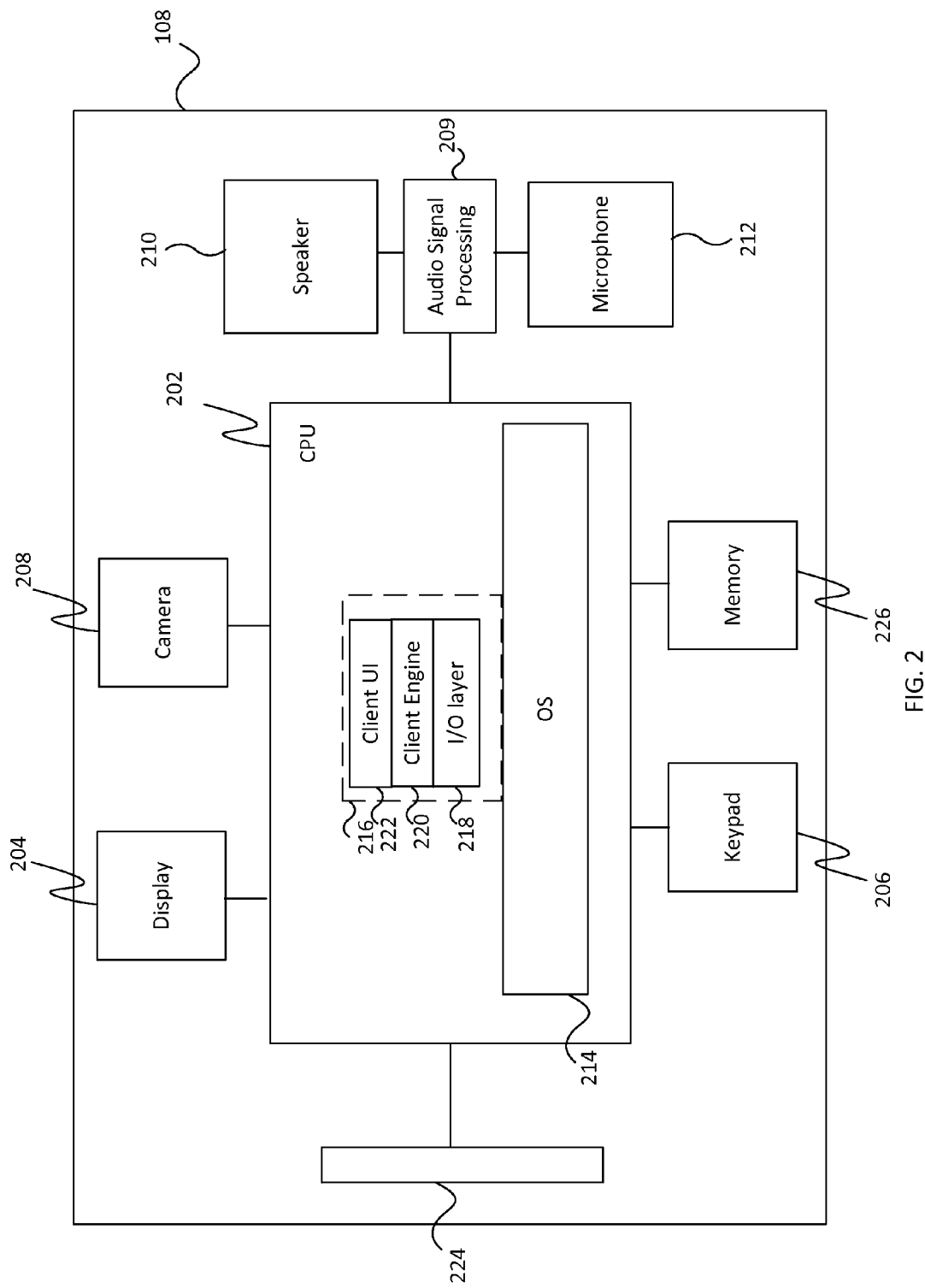
FIG. 2 is a schematic block diagram of a user terminal.

FIG. 2 illustrates a detailed view of the user terminal 108 on which is executed a communication client application 114 for communicating over the communication system 100. The user terminal 108 comprises a central processing unit ("CPU") 202, to which is connected a display 204 such as a screen or touch screen, input devices such as a keypad 206, a camera 208, and touch screen 204. An output audio device 210 (e.g. a speaker) and an input audio device 212 (e.g. a microphone) are connected to the CPU 202. The display 204, keypad 206, camera 208, output audio device 210 and input audio device 212 may be integrated into the user terminal 108 as shown in FIG. 2. In alternative user terminals one or more of the display 204, the keypad 206, the camera 208, the output audio device 210 and the input audio device 212 may not be integrated into the user terminal 102 and may be connected to the CPU 202 via respective interfaces. One example of such an interface is a USB interface. The CPU 202 is connected to a network interface 224 such as a modem for communication with the communication network 106. The network interface 224 may be integrated into the user terminal 108 as shown in FIG. 2. In alternative user terminals the network interface 224 is not integrated into the user terminal 108. The user terminal 108 also comprises a memory 226 for storing data as is known in the art. The memory 226 may be a permanent memory, such as ROM. The memory 226 may alternatively be a temporary memory, such as RAM.

At least one of the speaker 210 and the microphone 212 may be connected to the CPU 202 via an audio signal processing module 209. When the speaker 210 is connected to the CPU 202 via the audio signal processing module 209, any audio data generated for output on the user terminal 108 (e.g. by the client and other applications) must be supplied to the audio signal processing module 209 for processing before it is to be output via speaker 210. When the microphone 212 is connected to the CPU 202 via the audio signal processing module 209, any audio data received via the microphone 212 must be supplied to the audio signal processing module 209 for processing before it is to be transmitted over the network 106 via network interface 224.

The user terminal 108 may comprise other elements than those shown in FIG. 2.

The user terminal 108 is installed with the communication client application 114, in that the communication client application 114 is stored in the memory 226 and arranged for execution on the CPU 202. FIG. 2 also illustrates an operating system ("OS") 214 executed on the CPU 202. Running on top of the OS 214 is a software stack 216 for the communication client application 114 referred to above. The software stack shows an I/O layer 218, a client engine layer 220 and a client user interface layer ("UI") 222. Each layer is responsible for specific functions. Because each layer usually communicates with two other layers, they are regarded as being arranged in a stack as shown in FIG. 2. The operating system 214 manages the hardware resources of the computer and handles data being transmitted to and from the communication network 106 via the network interface 224. The I/O layer 218 comprises audio and/or video codecs which receive incoming encoded streams and decodes them for output to speaker 210 and/or display 204 as appropriate, and which receive unencoded audio and/or video data from the microphone 212 and/or camera 208 and encodes them for transmission as streams to other end-user terminals of the communication system 100. The client engine layer 220 handles the connection management functions of the VoIP system as discussed above, such as establishing calls or other connections by server-based or P2P address look-up and authentication. The client engine may also be responsible for other secondary functions not discussed herein. The client engine 220 also communicates with the client user interface layer 222. The client engine 220 may be arranged to control the client user interface layer 222 to present information to the user of the user terminal 108 via the user interface of the communication client application 114 which is displayed on the display 204 and to receive information from the user of the user terminal 108 via the user interface.

Figure 3:
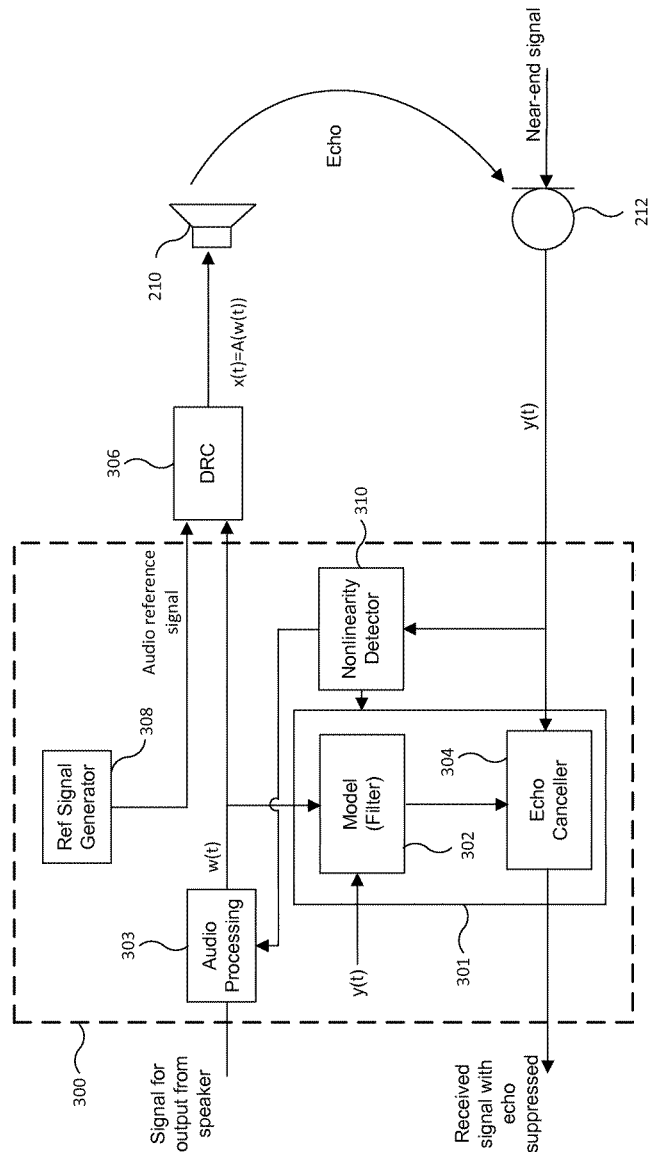
FIG. 3 is a functional diagram showing modules of the user terminal for use in echo removal.

With reference to FIG. 3 there is now described a method of echo cancellation. FIG. 3 is a functional diagram of a part of the user terminal 108.

As shown in FIG. 3, the user terminal 108 comprises the speaker 210, the microphone 212, and an audio signal processing module 300. The audio signal processing module 300 (shown as the dashed box in FIG. 3) represents the signal processing functionality implemented by executing communication client application 114 on the CPU 202 of user terminal 108. The audio signal processing module 300 comprises an echo removal module 301, an audio reference signal generator 308, and a non-linearity detector 310. The echo removal module 301 comprises a modelling module 302 comprising a filter module, and an echo cancellation module 304 implementing echo cancellation in this embodiment. The echo removal module 301 may additionally implement echo suppression in other embodiments. The signal processing functionality implemented by executing communication client application 114 may include more or less functionality than that shown in FIG. 3.

The user terminal 108 may further comprise the audio signal processing module 209. The audio signal processing module 209 comprises at least one non-linear processing module 306 shown in FIG. 3 in the form of a dynamic range compression (DRC) module 306 which is outside of the control of the audio signal processing module 300.

Whilst FIG. 3, illustrates a non-linear processing module 306 arranged to apply non-linear processing to audio signals signal prior to playout from the speaker 210. Alternatively or additionally, the user terminal 108 may comprise at least one non-linear processing module 306 arranged to process audio signals that have been output by the microphone 212.

Embodiments are described below with reference to the user terminal 108 comprising a DRC module 306 configured to apply dynamic range compression to an audio signal prior to playout from the speaker 210.

The audio signal processing module 300 is coupled to an input of the DRC module 306. In particular, an incoming audio signal w(t) (denoted "far-end signal") to be output from the speaker 210 is coupled to a first input of the DRC module 306. The output of the audio reference signal generator 308 is coupled to a second input of the DRC module 306a. An output of the DRC module 306 is coupled to the speaker 210. To model the echo path gains and estimate the echo captured by the microphone 212, a reference signal is needed which is the signal labelled w(t). This signal represents an audio signal w(t) that the communication client application 114 sends for playing out from the speaker 210, and which undergoes subsequent processing by the DRC module 306 outside of the software client domain before it can be output via the loudspeaker 210. The incoming audio signal w(t) is coupled to a first input of the modelling module 302. The output y(t) of the microphone 212 is coupled to a second input of the modelling module 302. The output y(t) of the microphone 212 is also coupled to a first input of the echo cancellation module 304. An output of the modelling module 302 is coupled to a second input of the echo cancellation module 304. An output of the echo cancellation module 304 is used to provide the received signal (with echo cancellation having been applied) for further processing in the user terminal 108.

The audio signal processing module 300 may comprise an audio processing component 303 configured to selectively perform audio processing on the audio signal w(t) to be output from the speaker 210. In one embodiment, the audio processing component 303 is a linear filter. In another embodiment, the audio processing component 303 is a gain control module. An output of the non-linearity detector 310 is coupled to the audio processing component 303.

The output y(t) of the microphone 212 is coupled to a first input of the non-linearity detector 310. The non-linearity detector 310 is configured to receive characteristics of an audio reference signal that is output from the audio reference signal generator 308. An output of the non-linearity detector 310 is coupled to the echo removal module 301. Operation of the non-linearity detector 310 as will be described in further detail later.

It should be noted that in the embodiments described herein there is just one speaker (indicated by reference numeral 210 in the figures) but in other embodiments there may be more than one speaker to which the signal to be outputted is coupled (for outputting therefrom). Similarly, in the embodiments described herein there is just one microphone (indicated by reference numeral 212 in the figures) but in other embodiments there may be more than one microphone which receives audio signals from the surrounding environment.

Here, the function "A(.)" is a pre-process operator that applies dynamic range compression (e.g. maximization); that is, "A(.)" represents the function performed by the DRC module 306 in generating the output x(t)=A(w(t)). The audio signal w(t) is the signal used as the echo cancellation reference, and is also sent to the DRC module 306.

An echo cancellation process performed by the modelling module 302 and the echo cancellation module 304 during a communication event (e.g. voice or video call) will now be described.

During the communication event (e.g. after the communication event has been established) an incoming audio signal w(t) is received which is to be outputted from the speaker 210. For example, the signal to be outputted may be a far-end signal that has been received at the user terminal 108 at network interface 220 from the user terminal 102 during a call between the users 104 and 110 over the communication system 100. An outgoing audio signal is outputted from the speaker 210 to the user 110.

The microphone 212 receives an audio signal. As shown in FIG. 3 the received audio signal may include a near-end signal which is a desired signal or "primary signal". The near-end signal is the signal that the user 110 intends the microphone 212 to receive (labelled as near-end in FIG. 3)—e.g. speech. However, the received audio signal also includes an echo signal resulting from the audio signals outputted from the speaker 210. The received audio signal may also include noise, such as background noise (not shown). Therefore, the total received audio signal y(t) can be given by the sum of the near-end signal, the echo and the noise. The echo and the noise act as interference for the near-end signal. Although not shown in FIG. 3, analogue to digital (ADC) conversion is applied to the signal captured by the microphone 212 to arrive at the digital signal y(t).

The modelling module (filter module) 302 takes as inputs the incoming audio signal w(t) and the received audio signal y(t). The modelling module 302 is used to model an echo path of the echo in the received audio signal y(t).

The echo path describes the effects of the acoustic paths travelled by the audio signals output from the speaker 210 to the microphone 212. The audio signal may travel directly from the speaker 210 to the microphone 212, or it may be reflected from various surfaces in the environment of the near-end terminal. The echo path traversed by the audio signal output from the speaker 210 may be regarded as a system having a frequency and a phase response which may vary over time.

In order to remove the acoustic echo s(t) from the signal y(t) recorded at the near-end microphone 212 it is necessary to estimate how the echo path changes the desired far-end speaker output signal to an undesired echo component in the input signal.

The echo path modelling assumes an approximately linear echo path in this case i.e. assumes that output signal amplitude of the echo path scales linearly with input signal amplitude of the echo path.

For an approximately linear echo path the echo path h(t) describes how the echo in the received audio signal y(t) relates to the far-end signal x(t) output from the speaker 210, e.g. for a linear echo path represented by the impulse response h(t) according to the equation: $s(t)=\Sigma_{n=0}^{N_{true}} h_n(t) x(t-n)$, where s(t) is the echo in the received audio signal y(t), $N_{true}$ is the number of samples of the outputted far-end signal x(t) which are received by the microphone 212 and $h_n(t)$ are the coefficients of the impulse response describing the echo path h(t). The echo path h(t) may vary in both time and frequency and may be referred to herein as h(t) or h(t,f). The echo path h(t) may depend upon (i) the current environmental conditions surrounding the speaker 210 and the microphone 212 (e.g. whether there are any physical obstructions to the passage of the audio signal from the speaker 210 to the microphone 212, the air pressure, temperature, wind, etc.), and (ii) characteristics of the speaker 210 and/or the microphone 212 which may alter the signal as it is outputted and/or received, and (iii) any other process of the signal that might not be reflected in the far-end signal—in particular, due to processing by the audio signal processing module 209 (but possibly also due to other factors e.g., buffer delays).

The modelling module 302 models the echo path h(t) associated with the echo in the received audio signal y(t) by determining a weighted sum of the current and a finite number (N) of previous values of the outputted far-end signal x(t). The modelling module 302 therefore implements an Nth order filter which has a finite length (in time) over which it considers the values of the outputted far-end signal x(t) in determining the estimate of the echo path $\hat{h}(t)$. In this way, the modelling module 302 dynamically adapts the filter estimate of the echo path $\hat{h}(t)$. The operation is described by the following equation, which defines the echo in the received audio signal y(t) in terms of the outputted far-end signal x(t): $\hat{s}_1(t)=\Sigma_{n=0}^{N} \hat{h}_n(t) \times (t-n)$. Therefore N+1 samples of the outputted far-end signal x(t) are used, with a respective N+1 weights $\hat{h}_n(t)$. The set of N+1 weights $\hat{h}_n(t)$ is referred to herein simply as the estimate of the echo path $\hat{h}_n(t)$. In other words the estimate of the echo path $\hat{h}(t)$ is a vector having N+1 values where the modelling module 302 implements an Nth order filter, taking N+1 values (e.g. N+1 frames) of the outputted far-end signal x(t) into account.

It can be appreciated that it is easier to adapt the filter estimate of the echo path $\hat{h}(t)$ when the echo is a dominant part of the received audio signal, that is when y(t)≡s(t). However, it may be possible to adapt the filter estimate of the echo path $\hat{h}(t)$ even when the echo is not a dominant part of the received audio signal y(t) if the echo s(t) is independent of the other signal components of y(t).

It will be appreciated by one skilled in the art that the estimate of the echo path $\hat{h}(t)$ does not need to be explicitly calculated, but could be represented by means of filter coefficients obtained from stochastic gradient algorithms such as Least Mean Squares (LMS), Normalized Least Mean Squares (NLMS), Fast Affine Projection (FAP) and Recursive Least Squares (RLS).

The estimate of the echo path $\hat{h}(t)$ is used to provide filter coefficients that filter the far-end signal to generate an estimate s(t) of the echo component in the microphone signal y(t) in accordance with the estimate of the echo path $\hat{h}(t)$.

Regardless of the particular algorithm used, the filter coefficients of the modelling module 302 are updated with each iteration of the algorithm, thus the coefficients of the modelling module 302 are continually updated over time regardless of the signal conditions at hand.

Whilst the above description refers to the use of a time domain FIR model of the echo path to estimate the echo component in the near end signal y(t) it will be appreciated by those skilled in the art that this is just an example and not limiting in any way. That is, the modelling module 302 may operate to determine an estimate of the echo path $\hat{h}(t)$ and thus an estimate s(t) of the echo component in the near end signal y(t) in the time domain or in the frequency domain.

Estimation of the echo path is typically based on high energy signals as those are the signals that produce the most reliable echo path estimates.

The echo cancellation module 304 is arranged to receive as input the estimate s(t) of the echo component in the microphone signal and the microphone signal y(t), and subtract an estimate of the echo signal s(t) from the received audio signal y(t).

The echo cancellation module 304 outputs the received signal, with the echo having been cancelled, e.g. for further processing on the user terminal 108. For instance, the signal output from the echo cancellation module 304 may be processed by the communication client application 104 (e.g. encoded and packetized) and then transmitted over the network 106 to the user terminal 102 in a call between the users 104 and 110.

The at least one non-linear processing module 306 (e.g. in the form of a dynamic range compression (DRC) module 306) and/or the mechanical properties of one or more of the loudspeaker 210 and microphone 212 (e.g. mechanical noise by loose parts in these components or in their housing) may introduce nonlinearities in the echo path thereby causing echo leaks or echo residuals in the signal output from the echo cancellation module 304.

In embodiments of the present disclosure, the presence and nature of nonlinearities in the echo path can be identified prior to a communication event being established such that when the communication event is established, the echo removal process implemented by the echo removal module 301 has already been configured to take into account the nonlinearities in the echo path.

Figure 4:
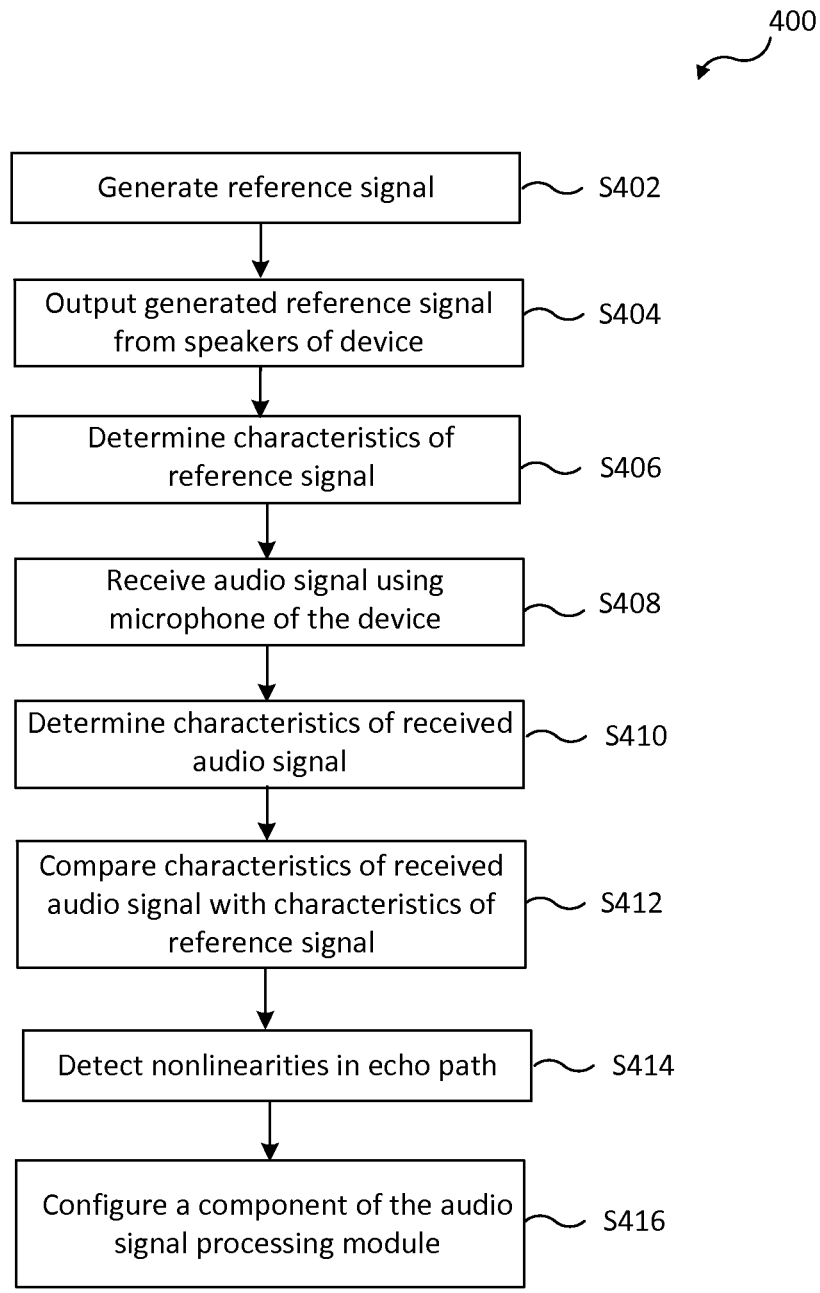
FIG. 4 is a flow chart for a detecting non-linearities in an echo path.

FIG. 4 is a flowchart for a process 400 performed by the audio signal processing module 300.

The process 400 is performed prior to a communication event (e.g. voice or video call) being established such that the audio signal processing module 300 is configured in advance and in preparation of the communication event.

At step S402, the audio reference signal generator 308 generates an audio reference signal, and supplies the generated audio reference signal for playout by the speaker 210 at step S404.

The audio reference signal generator 308 may incorporate the generated audio reference signal in a ringtone audio signal which the communication client application 114 plays out of speaker 210 when a request to establish a communication event is received over the network 106 (e.g. from user terminal 102). That is, the generated audio reference signal acts as a pilot signal in the ringtone.

Alternatively, the generated audio reference signal is not incorporated in a ringtone which the communication client application 114 plays out of speaker 210 when a request to establish a communication event is received over the network 106 (e.g. from user terminal 102). When a request to establish a communication event is received over the network 106 (e.g. from user terminal 102), the audio reference signal generator 308 may be configured to supply the generated audio reference signal for playout by the speaker 210 prior to the ringtone being played out by speaker 210. In other embodiments, a received request to establish a communication event does not trigger the output of the generated audio reference signal by the audio reference signal generator 308. For example, the audio reference signal generator 308 may generate the audio reference signal, and supply the generated audio reference signal for playout by the speaker 210 periodically.

By playing out the generated audio reference signal prior to a communication event being established, users (e.g. users 104 and 110) participating in the communication event are not disturbed by the generated audio reference signal during the communication event.

At step S406, the non-linearity detector 310 determines characteristics of the generated audio reference signal that is played out at step S404. This step may be performed in various ways.

The communication client application 114 may store characteristics of the generated audio reference signal in memory 226. Thus at step S408, the non-linearity detector 310 may determine characteristics of the generated audio reference signal by transmitting a query to the memory 226 and receiving a reply comprising the characteristics of the generated audio reference signal.

Alternatively, the generated audio reference signal that is output from the audio reference signal generator 308 may be supplied to the non-linearity detector 310 (this is not shown in FIG. 3) and the non-linearity detector 310 may determine characteristics of the generated audio reference signal in response to receiving the generated audio reference signal.

The determined characteristics of the generated audio reference signal may comprise a power envelope of the generated audio reference signal that reflects variations in peaks in audio signal power. For example the generated audio reference signal may have a power envelope that linearly increases over a predetermined period of time at a certain rate. Alternatively, the generated audio reference signal may have a power envelope that linearly decreases over a predetermined period of time at a certain rate. That is, the characteristics of the generated audio reference signal may comprise information as to whether the power envelope of the generated audio reference signal linearly increases or decreases over predetermined period of time.

Additionally or alternatively, the determined characteristics of the generated audio reference signal may comprise the frequency characteristics of the generated audio reference signal. For example, the generated audio reference signal may have a constant fundamental frequency, or a fundamental frequency that varies over a predetermined period of time (e.g. increases and/or decreases over a predetermined period of time). That is, the characteristics of the generated audio reference signal may include the constant fundamental frequency, or information how the fundamental frequency of the generated audio reference signal varies over the predetermined period of time.

At step S408, the communication client application 114 activates the microphone 212 such that the microphone is able to receive the generated audio reference signal after it has traversed the echo path.

As shown in FIG. 3, the microphone signal y(t) that is output from the microphone 212 is supplied to the non-linearity detector 310. The microphone signal y(t) comprises the generated audio reference signal after it has traversed the echo path.

At step S410, the non-linearity detector 310 determines characteristics of the microphone signal y(t) received from the microphone 212.

The determined characteristics of the microphone signal y(t) may comprise a power envelope of the microphone signal y(t) that reflects variations in peaks in audio signal power. Additionally or alternatively, the determined characteristics of the microphone signal y(t) may comprise the frequency characteristics of the microphone signal y(t).

At step S412, the non-linearity detector 310 compares the characteristics of the generated audio reference signal determined ay step S406 with the characteristics of the microphone signal y(t) determined ay step S410, in order to determine whether non-linearities are present in the echo path.

Figure 5B:
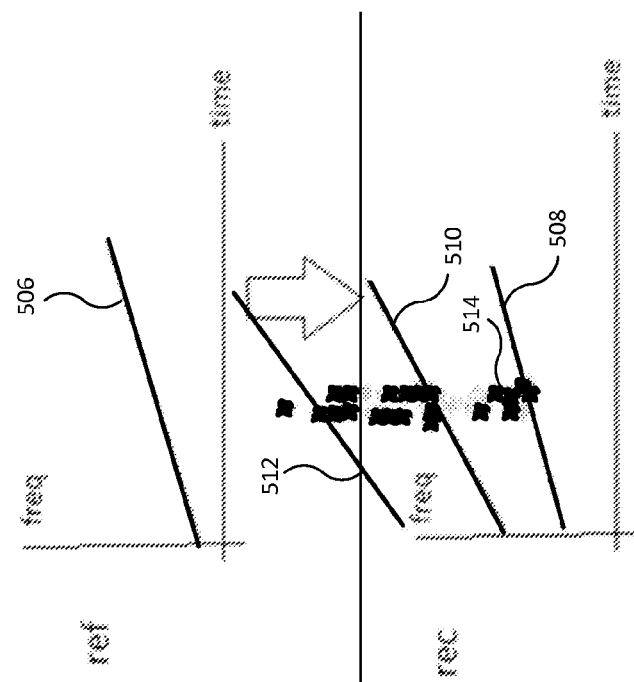
FIGS. 5a and 5b illustrate example generated audio reference signals and example microphone signals.
Figure 5A:
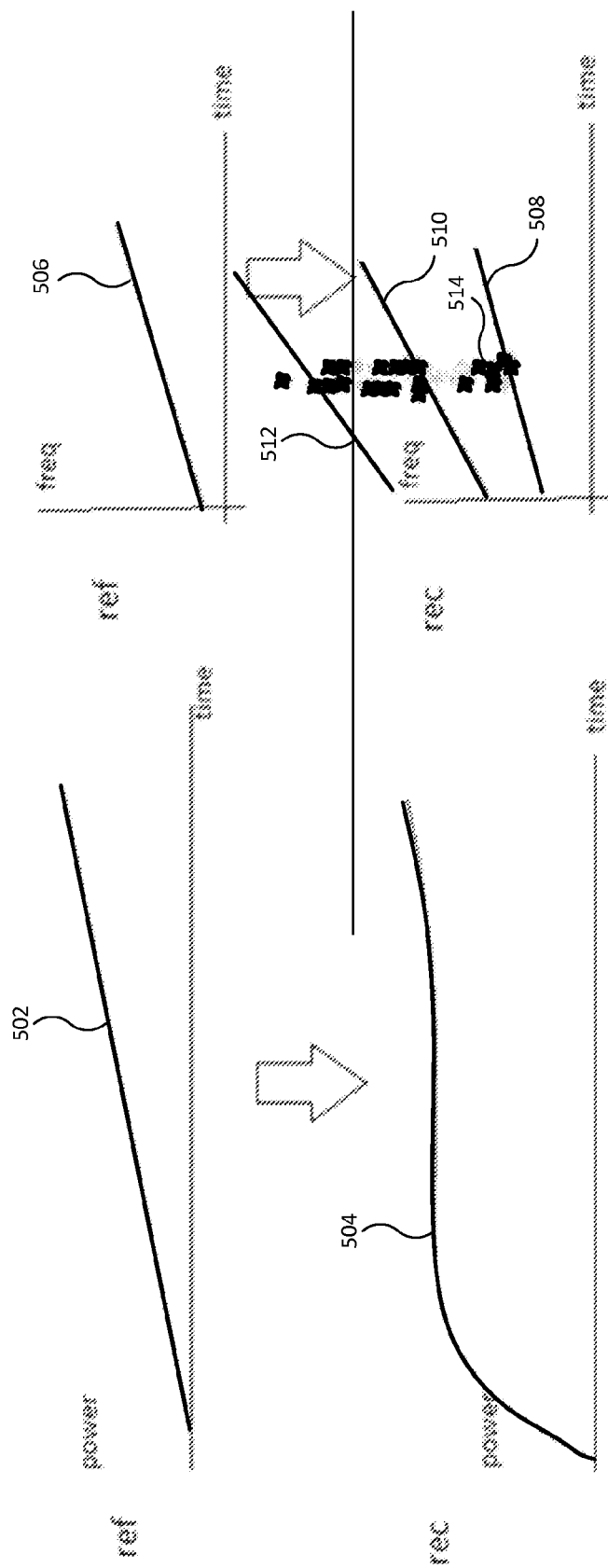

Reference is now made to FIGS. 5a and 5b which illustrate example generated audio reference signals and example microphone signals.

The top plot of FIG. 5a illustrates an example generated audio reference signal 502 that is output by speaker 210 at step S404, that has a power envelope that linearly increases over a predetermined period of time at a certain rate.

The bottom plot of FIG. 5a illustrates an example microphone signal y(t) 504 that is recorded by the microphone 212 and supplied to the non-linearity detector 310 that has a power envelope that increases non-linearly over the predetermined period of time.

In this scenario, based on a comparison of the power envelope of the generated audio reference signal 502 and the power envelope of the microphone signal y(t) 504, the non-linearity detector 310 detects that non-linearities are present in the echo path at step S414 based on the power envelope of the microphone signal y(t) 504 varying non-linearly (e.g. not exhibiting the linear increase of that of the generated audio reference signal 502). That is, that nonlinear processing in the echo path has effected the generated audio reference signal 502.

The top plot of FIG. 5b illustrates an example generated audio reference signal 506 that is output by speaker 210 at step S404, that has a fundamental frequency that linearly increases over a predetermined period of time at a certain rate.

The bottom plot of FIG. 5b illustrates an example microphone signal y(t) that is recorded by the microphone 212 and supplied to the non-linearity detector 310 that has a component 508 that has a fundamental frequency, f, that linearly increases over that predetermined period of time in the same manner as the generated audio reference signal 506, and has additional components 510 and 512 that are harmonic overtones at integer multiples (e.g. at 2f 3f etc.) of the fundamental frequency of the component 508. This harmonic distortion is typically caused by non-linear processing such as DRC and gain scheduling.

In this scenario, based on a comparison of the frequency characteristics of the generated audio reference signal 506 and the frequency characteristics of the microphone signal y(t) 504, the non-linearity detector 310 detects that non-linearities are present in the echo path at step S414 based on the detection of the harmonic overtone components 510 and 512 in the microphone signal y(t). That is, that non-linearities in the echo path has effected the generated audio reference signal 506.

Persons skilled in the art will appreciate that aliasing may occur, which could make the overtone pattern appear non-harmonic. In this scenario, the non-linearity detector 310 may still be able to detect that non-linearities are present in the echo path at step S414 based on the detection of non-harmonic overtone components in the microphone signal y(t).

Whilst FIG. 5b is described with reference to the generated audio reference signal comprising a single excitation tone 506. If the generated audio reference signal comprises two or more excitation tones at different frequencies e.g. F1 and F2. In this scenario, based on a comparison of the frequency characteristics of the generated audio reference signal and the frequency characteristics of the microphone signal y(t), the non-linearity detector 310 detects that non-linearities are present in the echo path at step S414 based on the detection of at least one intermodulation product components in the microphone signal y(t) (e.g. a $2^{nd}$ order intermodulation product F1+F2−a sum frequency, $2^{nd}$ order intermodulation product F2−F1−a difference frequency, and/or higher order intermodulation products). That is, that non-linearities in the echo path has effected the generated audio reference signal.

As shown in the bottom plot of FIG. 5b, the microphone signal y(t) may also comprise spurious non-harmonic components 514 cause by for example mechanical vibration of the speaker 210 and/or the microphone 212 with their enclosure on the user terminal 108. The spurious non-harmonic components 514 shown in the bottom plot of FIG. 5b exemplify rattling/buzzing that depend on excitation signal frequency. These spurious components 514 may or may not be excitation signal frequency dependent. In this scenario, based on a comparison of the frequency characteristics of the generated audio reference signal and the frequency characteristics of the microphone signal y(t), the non-linearity detector 310 detects that non-linearities are present in the echo path at step S414 based on the detection of these spurious non-harmonic components 514.

These spurious non-harmonic components 514 can be detected for example by seeing that noise is present in a plurality of different frequency ranges.

Once, the non-linearity detector 310 detects that non-linearities are present in the echo path at step S414, the process 400 proceeds to step S416 where the non-linearity detector 310 configures a component of the audio signal processing module 300 based on the detection at step S414.

Step S416 may be implemented in various ways.

In some embodiments, the non-linearity detector 310 is arranged to configure the echo removal module 301 at step S416.

At step S416, the non-linearity detector 310 may configure the modelling module 302 to use a non-linear model to model the echo path of the echo to determine a non-linear model estimate of the echo, and control the echo cancellation module to perform said echo cancellation using the non-linear model estimate of the echo. The non-linear model for example be a Volterra series. Other non-linear models are well known to persons skilled in the art and are therefore not described in detail herein.

In the embodiments described above, and shown in the Figures, the echo removal module 301 implements echo cancellation.

Due to possible inaccuracies in the estimate of the echo signal, a residual echo may remain in the received audio signal after being processed by the echo cancellation module 304. Therefore in other embodiments, the echo removal module 301 may comprise an echo suppression module to suppress the residual echo. That is, echo suppression may be applied by the echo removal module 301 downstream of (i.e. after) the echo cancellation in the processing of the received audio signal y(t).

The echo suppression module 310 is arranged to receive as input the estimate of the echo component in the microphone signal s(t) and the audio signal output from the echo cancellation module 304. The echo suppression module 310 is arranged to determine the power of the estimated echo and the power of the audio signal output from the echo cancellation module 304. In the echo suppression module 310 the estimated echo power is used together with the determined power of the audio signal output from the echo cancellation module 304 to form echo suppression gains G(t,f) for time t and frequency f to suppress the any residual echo present in the audio signal output from the echo cancellation module 304, to a level sufficiently low for it not to be noticeable/disturbing in the presence of the near-end sounds (non-echo sounds) picked up by the microphone 212. Echo suppression methods are known in the art. Furthermore, the echo suppression method applied by the echo suppression module may be implemented in different ways. As such, the exact details of the echo suppression method are not described in detail herein.

Additionally or alternatively, at step S416 the non-linearity detector 310 may configure the modelling module to use a non-linear model to model the echo path of the echo to determine a non-linear model estimate of the echo, and control the echo suppression module said echo suppression using the non-linear model estimate of the echo. That is, the echo suppression gains G(t,f) are formed based on the non-linear model estimate of the echo.

Step S416 may be performed based on the nature (i.e. type) of the nonlinearities in the echo path.

For example, in response to the non-linearity detector 310 detecting that non-linearities are present in the echo path based on the detection of the frequency dependent spurious non-harmonic components 514 referred to above, the non-linearity detector 310 may configure the audio processing component 303, instead of the modelling module 302.

The audio processing component 303 may be a linear filter configured to selectively perform filtering on audio signals prior to playout by the loudspeaker 210. In this embodiment, the non-linearity detector 310 is configured to control the linear filter to perform filtering (e.g. to create a band-stop) based on detection of the non-linear echo path so that these frequencies are not excited as much (the audio signals are modified by the linear filter before they are played out).

The audio processing component 303 may be a gain control module configured to apply gain to audio signals prior to playout by the loudspeaker 210. In this embodiment, the non-linearity detector 310 is configured to control the gain control module to adjust the gain (e.g. lower) applied to the audio signals based on detection of the non-linear echo path. This causes harmonic distortion on the reference signal w(t) to match that of the system.

Thus embodiments of the present disclosure advantageously identify the presence and nature of nonlinearities in the echo path caused by at least one non-linear processing module, the functionality of which is outside of the control of the communication client application 114, by comparing known characteristics of a locally generated audio reference signal that is played out using a speaker of a device and characteristics of an audio signal that is received using a speaker of that same device. This enables the echo removal module 301 to be configured in advance of a communication event being established such that when the communication event is established the echo removal module 301 has already been configured to take into account nonlinearities in the echo path.

The non-linearity detector 310 can diminish or decrease the effect the non-linear echo path has on the echo removal module's performance during the communication event. The echo path will probably not be modelled accurately, since it is non-linear, but the non-linearity detector 310 takes other steps (described above) to prevent echo leaks in spite of this inaccuracy. This represents a computationally efficient mechanism for dealing with nonlinear echo paths as it does not require any form of non-linear modeling (which is likely to be computationally expensive).

Dynamic range compression implemented on user terminal 108 may comprise upward compression performed on an input signal to generate an output signal having a narrower dynamic range than the input signal (increases the loudness of sounds below a threshold while leaving louder sounds unchanged) and/or downward compression performed on an input signal to generate an output having a narrower dynamic range than the input signal (reduces loud sounds over a certain threshold while quiet sounds remain unaffected).

Whilst the non-linear processing that is outside of the control of the communication client application 114 has been described with reference to dynamic range compression, this is merely an example and additional and/or alternative non-linear processing performed on audio signals prior to being output by the speaker 210, or on audio signals received by the microphone 212 may introduce nonlinearities in the echo path and be detected in accordance with embodiments of the present disclosure. For example non-linear processing such as gain scheduling, multi-band compression, speaker-protection related processing, external AEC, and external noise reduction. The external AEC and external noise reduction are performed on the received microphone audio signal y(t) but these are in fact non-linear and pose problems for an echo cancellation module that tries to estimate the echo path.

Embodiments of the present disclosure are also applicable when an audio signal processing module 209 is not present on the user terminal 108. For example the non-linearities in the echo path may be caused by the physical properties of one or more of the loudspeaker, microphone and casing of the user terminal.

Whilst in the above, the subject matter is used in the context of acoustic echo cancellation, in general the subject matter may be employed in the context of any audio signal processing that processes a microphone using a reference e.g. any audio signal processing processes the microphone signal based on an assumption of there being a linear relationship between the reference and at least a component of the microphone signal.

The methods described herein may be implemented by executing a computer program product (e.g. the communication client application 114) at the user terminal 108. That is, a computer program product may be configured to perform audio signal processing (e.g. echo cancellation) in an acoustic system comprising the user terminal 108. The acoustic system may further comprise at least one further user terminal. The computer program product is embodied on a computer-readable storage medium (e.g. stored in the memory 226) and configured so as when executed on the CPU 202 of user terminal 108 to perform the operations of any of the methods described herein.

A first aspect of the present disclosure has been described above.

The generated audio reference signal may be incorporated into a ringtone audio signal that is transmitted to the loudspeaker component for playout responsive to the user terminal receiving a request to establish the communication event.

The generated audio reference signal may be transmitted to the loudspeaker component for playout responsive to the user terminal receiving a request to establish the communication event prior to a ringtone audio signal being transmitted via the audio processing module to the loudspeaker component for playout.

The generated audio reference signal may be transmitted to the loudspeaker component for playout prior to the user terminal receiving a request to establish the communication event.

The determined characteristics of the audio reference signal may comprise a linearly varying power envelope and the determined characteristics of the received audio signal comprise a power envelope of the received audio signal.

The detector may be configured to detect the nonlinear echo path based on a detection that the power envelope of the received audio signal varies non-linearly.

The determined characteristics of the audio reference signal may comprise frequency characteristics of the audio reference signal, and the determined characteristics of the received audio signal comprise frequency characteristics of the received audio signal.

The detector may be configured to detect the nonlinear echo path based on a detection that the received audio signal comprises at least one audio component that has a fundamental frequency that is an integer or non-integer multiple of the fundamental frequency of the audio reference signal.

The detector may be configured to detect the nonlinear echo path based on a detection that the received audio signal comprises audio components in a plurality of different frequency ranges.

The detector may be arranged to configure the echo removal module based on said detection.

The echo removal module may comprise a modelling module configured to model the echo path of the echo to determine a model estimate of the echo.

The echo removal module may comprise an echo cancellation module configured to perform echo cancellation on audio signals received via the microphone component, and the detector may be configured, based on said detection, to configure the modelling module to use a non-linear model to model the echo path of the echo to determine a non-linear model estimate of the echo, and control the echo cancellation module to perform said echo cancellation using the non-linear model estimate of the echo.

The echo removal module may further comprise an echo suppression module configured to perform echo suppression on audio signals output from the echo cancellation module, and the detector may be configured, based on said detection, to configure the modelling module to use a non-linear model to model the echo path of the echo to determine a non-linear model estimate of the echo, and control the echo suppression module to perform said echo suppression using the non-linear model estimate of the echo.

The audio signal processing module may comprise an audio processing component configured to process audio signals prior to playout by the loudspeaker, and the detector may be arranged to configure the audio processing component based on said detection.

The audio processing component may be a linear filter configured to selectively perform filtering on said audio signals prior to playout by the loudspeaker, wherein the detector is configured to control the linear filter to perform said filtering based on said detection.

The audio processing component may be a gain control module configured to apply gain to audio signals prior to playout by the loudspeaker, wherein the detector is configured to control the gain control module to adjust the gain applied to said audio signals based on said detection.

The user terminal may further comprise a memory storing characteristics of the audio reference signal, wherein the detector is configured to determine the characteristics of the audio reference signal by querying said memory.

The detector may be configured to receive the audio reference signal, and determine the characteristics of the audio reference signal in response to receiving the audio reference signal.

Generally, any of the functions described herein (e.g. the functional modules shown in FIG. 3 and the functional steps shown in FIG. 4) can be implemented using software, firmware, hardware (e.g., fixed logic circuitry), or a combination of these implementations. The modules and steps shown separately in FIG. 3 and FIG. 4 may or may not be implemented as separate modules or steps. The terms "module," "functionality," "component" and "logic" as used herein generally represent software, firmware, hardware, or a combination thereof. In the case of a software implementation, the module, functionality, or logic represents program code that performs specified tasks when executed on a processor (e.g. CPU or CPUs). The program code can be stored in one or more computer readable memory devices. The features of the techniques described herein are platform-independent, meaning that the techniques may be implemented on a variety of commercial computing platforms having a variety of processors. For example, the user devices may also include an entity (e.g. software) that causes hardware of the user devices to perform operations, e.g., processors functional blocks, and so on. For example, the user devices may include a computer-readable medium that may be configured to maintain instructions that cause the user devices, and more particularly the operating system and associated hardware of the user devices to perform operations. Thus, the instructions function to configure the operating system and associated hardware to perform the operations and in this way result in transformation of the operating system and associated hardware to perform functions. The instructions may be provided by the computer-readable medium to the user devices through a variety of different configurations.

One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may us magnetic, optical, and other techniques to store instructions and other data.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A user terminal comprising;
a loudspeaker component;
a microphone component; and
an audio signal processing module, the audio signal processing module comprising:
an audio reference signal generator configured, prior to establishment of a communication event over a communications network with at least one further user terminal, to generate an audio reference signal with a linearly varying power envelope, and output the audio reference signal to the loudspeaker component for playout;
an echo removal module configured to perform echo removal on audio signals received via the microphone component during the communication event; and
a detector configured, prior to establishment of the communication event, to:
determine characteristics of the audio reference signal;
receive an audio signal output from the microphone component, wherein the received audio signal includes echo resulting from the outputted audio reference signal;
determine characteristics of the received audio signal;
compare the determined characteristics of the audio reference signal with the determined characteristics of the received audio signal to detect a nonlinear echo path of the echo, and
configure a component of the audio signal processing module based on said detection.

2. The user terminal of claim 1, wherein the generated audio reference signal is incorporated into a ringtone audio signal that is transmitted to the loudspeaker component for playout responsive to the user terminal receiving a request to establish the communication event.

3. The user terminal of claim 1, wherein the generated audio reference signal is transmitted to the loudspeaker component for playout responsive to the user terminal receiving a request to establish the communication event prior to a ringtone audio signal being transmitted via the audio processing module to the loudspeaker component for playout.

4. The user terminal of claim 1, wherein the generated audio reference signal is transmitted to the loudspeaker component for playout prior to the user terminal receiving a request to establish the communication event.

5. The user terminal of claim 1, wherein the determined characteristics of the received audio signal comprise a power envelope of the received audio signal.

6. The user terminal of claim 5, wherein the detector is configured to detect the nonlinear echo path based on a detection that the power envelope of the received audio signal varies non-linearly.

7. The user terminal of claim 1, wherein the determined characteristics of the audio reference signal comprise frequency characteristics of the audio reference signal, and the determined characteristics of the received audio signal comprise frequency characteristics of the received audio signal.

8. The user terminal of claim 7, wherein the detector is configured to detect the nonlinear echo path based on a detection that the received audio signal comprises at least one audio component that has a fundamental frequency that is an integer or non-integer multiple of the fundamental frequency of the audio reference signal.

9. The user terminal of claim 7, wherein the detector is configured to detect the nonlinear echo path based on a detection that the received audio signal comprises audio components in a plurality of different frequency ranges.

10. The user terminal of claim 1, where the detector is arranged to configure the echo removal module based on said detection.

11. The user terminal of claim 1, wherein the echo removal module comprises a modelling module configured to model the echo path of the echo to determine a model estimate of the echo.

12. The user terminal of claim 11, wherein the echo removal module comprises an echo cancellation module configured to perform echo cancellation on audio signals received via the microphone component, and the detector is configured, based on said detection, to configure the modelling module to use a non-linear model to model the echo path of the echo to determine a non-linear model estimate of the echo, and control the echo cancellation module to perform said echo cancellation using the non-linear model estimate of the echo.

13. The user terminal of claim 12, wherein the echo removal module further comprises an echo suppression module configured to perform echo suppression on audio signals output from the echo cancellation module, and the detector is configured, based on said detection, to configure the modelling module to use a non-linear model to model the echo path of the echo to determine a non-linear model estimate of the echo, and control the echo suppression module to perform said echo suppression using the non-linear model estimate of the echo.

14. The user terminal of claim 1, where the audio signal processing module comprises an audio processing component configured to process audio signals prior to playout by the loudspeaker, and the detector is arranged to configure the audio processing component based on said detection.

15. The user terminal of claim 14, wherein the audio processing component is a linear filter configured to selectively perform filtering on said audio signals prior to playout by the loudspeaker, wherein the detector is configured to control the linear filter to perform said filtering based on said detection.

16. The user terminal of claim 14, wherein the audio processing component is a gain control module configured to apply gain to audio signals prior to playout by the loudspeaker, wherein the detector is configured to control the gain control module to adjust the gain applied to said audio signals based on said detection.

17. The user terminal of claim 1, further comprising a memory storing characteristics of the audio reference signal, wherein the detector is configured to determine the characteristics of the audio reference signal by querying said memory.

18. The user terminal of claim 1, wherein the detector is configured to receive the audio reference signal, and determine the characteristics of the audio reference signal in response to receiving the audio reference signal.

19. At least one computer readable storage medium storing a communication client application which, when executed on one or more processors of a user terminal causes the one or more processors to:
generate an audio reference signal with a linearly varying power envelope prior to establishment of a communication event over a communications network with at least one further user terminal, and supply the audio reference signal to a loudspeaker component of the user terminal;
perform echo removal on audio signals received via a microphone component of the user terminal during the communication event; and
prior to establishment of the communication event:
determine characteristics of the audio reference signal;
receive an audio signal output from the microphone component, wherein the received audio signal includes echo resulting from the outputted audio reference signal;
determine characteristics of the received audio signal;
compare the determined characteristics of the audio reference signal with the determined characteristics of the received audio signal to detect a nonlinear echo path of the echo; and
configure a component of the communication client application based on said detection.

20. A computer-implemented method performed by a communication client application when executed on one or more processors of a user terminal, the method comprising:
generating an audio reference signal prior to establishment of a communication event over a communications network with at least one further user terminal, the audio reference signal having a fundamental frequency that varies;
supplying the audio reference signal to a loudspeaker component of the user terminal;
prior to establishment of the communication event:
determining characteristics of the audio reference signal,
receiving an audio signal output from the microphone component, wherein the received audio signal includes echo resulting from the outputted audio reference signal;
determining characteristics of the received audio signal,
comparing the determined characteristics of the audio reference signal with the determined characteristics of the received audio signal to detect a nonlinear echo path of the echo, and
configuring a component of the communication client application based on said detection.

* * * * *